United States Patent [19]
Libicki

[11] B 3,916,737
[45] Nov. 4, 1975

[54] APPARATUS FOR MANUFACTURING A BELLOWS SEALS

[75] Inventor: Henry J. Libicki, Lorain, Ohio

[73] Assignee: Nordson Corporation, Amherst, Ohio

[22] Filed: Oct. 3, 1972

[21] Appl. No.: 294,579

[44] Published under the Trial Voluntary Protest Program on January 28, 1975 as document no. B 294,579.

[52] U.S. Cl. .......................... 82/11; 29/454; 82/98; 82/101
[51] Int. Cl.² .......................................... B23B 3/28
[58] Field of Search .......... 29/454, 527.1; 83/5, 54, 83/185, 178, 917; 82/98, 47, 101, 102, 117

[56] References Cited
UNITED STATES PATENTS

| | | | |
|---|---|---|---|
| 1,926,628 | 9/1933 | Morehouse | 29/454 UX |
| 2,175,596 | 10/1939 | Erling | 83/54 X |
| 2,304,828 | 12/1942 | Joy | 82/98 |
| 3,381,361 | 5/1968 | DeCuissart et al. | 29/454 X |
| 3,465,641 | 9/1969 | Allison | 83/917 X |

FOREIGN PATENTS OR APPLICATIONS

| | | | |
|---|---|---|---|
| 820,544 | 9/1959 | United Kingdom | 29/454 |

Primary Examiner—Charlie T. Moon
Attorney, Agent, or Firm—Wood, Herron & Evans

[57] ABSTRACT

A method and apparatus for manufacturing a thin walled flexible bellows seal. The inside and outside channels or grooves of the convolutions are machined alternately and sequentially from a rigid blank so that cutting resistance is minimized and blank rigidity is maintained throughout the machining cycle.

7 Claims, 9 Drawing Figures

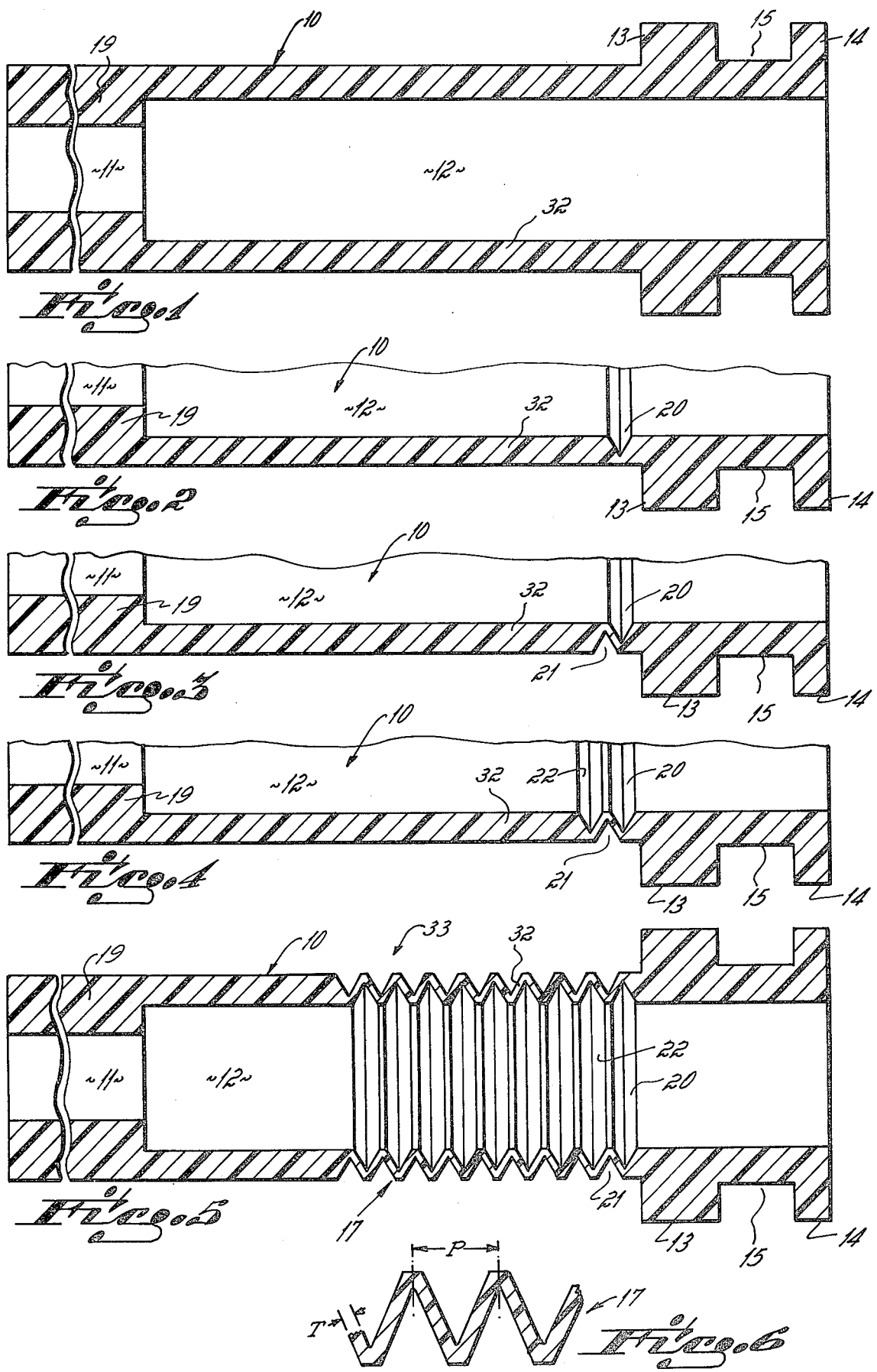

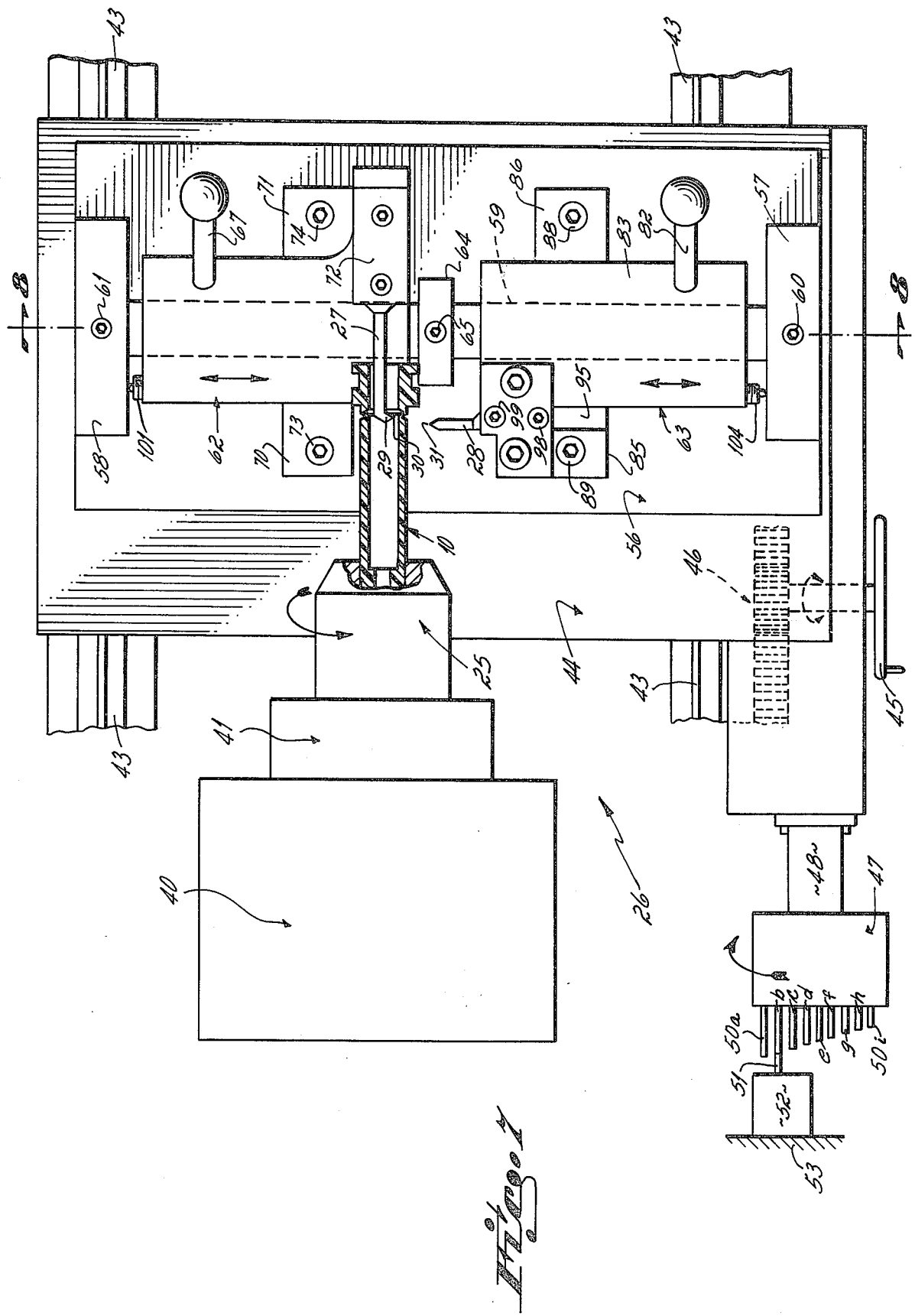

APPARATUS FOR MANUFACTURING A BELLOWS SEALS

This invention relates to the manufacture of expandable bellows seals and particularly to a new method and apparatus for manufacturing such seals.

Seals are classified as either static seals or dynamic seals. A dynamic seal is one which permits a movable element to pass through and move relative to it while a static seal does not permit relative movement between it and the parts between which it effects a seal. If the two parts between which a static seal is located are relatively movable, the seal must be flexible to accommodate the relative movement. One such flexible static seal is a bellows seal which has convoluted side walls capable of being either expanded or contracted in length. One common application for this type of seal is in electrostatic spray guns which require a high pressure seal between movable valve components. Such an application is disclosed in copending U.S. application Ser. No. 199,114, now U.S. Pat. No. 3,747,850, of Donald R. Hastings et al. for "Electrostatic Spray Gun." That pending application is assigned to the assignee of this application.

Bellows type seals are generally manufactured from rubber, metal or plastic by either a molding or machining process. In general, the molding procedure has been acceptable for rubber seals but has been unacceptable for plastic or metal bellows seals. In general, the difficulty of molding convoluted plastic or metal walls thin enough to be flexible has precluded that manufacturing technique for these materials.

Whenever the application requires a material other than rubber, such as plastic or metal, the bellows seal has been machined from a rigid stock blank and the machining procedure has been carried out in a lathe. That machining process, though, has been very uneconomical because it is very tedious, time-consuming and generates a large percentage of scrap. Even the most skilled lathe operators find it difficult to machine consistently thin walled, convoluted bellows without generating a large percentage of scrap parts.

It has therefore been one objective of this invention to provide a new method and apparatus for machining bellows seals from rigid blanks so as to create thin walled, highly elastic bellows seals from rigid bar stock.

Still another objective of this invention has been to provide a new method and apparatus for producing machined bellows seals inexpensively and while generating very few scrap parts.

Still another objective of this invention has been to provide a method and apparatus for producing bellows seals which have an elongation factor greater than any heretofore produced on a production or commercial scale. Specifically, the practice of the invention of this application enables plastic bellows seals to be relatively easily and inexpensively manufactured which have an elongation factor of 300 percent. That is, they are expansible from a fully compressed dimension to a fully expanded one through a range of 300 percent elongation.

The invention of this application which accomplishes these objectives comprises a method and apparatus for machining a tubular blank of Teflon or other rigid material by alternately machining generally V-shaped grooves first on the inside and then on the outside of the blank and continuing the process throughout the length of the tube until the necessary length of bellows configuration is obtained. This procedure enables the wall thickness to be made uniform throughout the length of the tube with as little as 0.015 inch stock left in the side walls of the convolutions. Because the convolutions are machined one at a time from one end toward the other, there is very little heat generated in the part and that small amount of heat may be easily dissipated without any resulting heat checks, cracks, or defects in the part. Further, the sequential machining of first the inside, then the outside, and the inside again, etc., of the grooves enables the rigidity of the tube to be maintained in the area which is currently being machined or is still to be machined. Consequently, the blank may be chucked without any outboard supports resting against the relatively weak flexible section of the bellows.

The primary advantage of this invention is that it enables a very thin walled highly flexible bellows to be manufactured from relatively high tensile strength materials which have very desirable physical properties, as for example, high dielectric resistance, high fatigue failure rates, as well as very high flexibility. This invention also enables such bellows seals to be manufactured to consistently small tolerances and with very thin walls without the loss of a high percentage of parts to scrap.

The apparatus which facilitates the practice of this method of manufacturing bellows seals comprises a lathe setup for sequentially placing both inside and outside turning tools in a proper longitudinal position relative to a workpiece to effect the sequential cuts in first the inside and then the outside walls of the workpiece. It also includes stops for accurately limiting the depth of both inside and outside cuts.

This apparatus or lathe machine setup has the advantage of enabling unskilled machine operators to machine parts easily and conveniently with absolutely no scrap so long as the operators follow four sequential steps in machining the parts. Additionally, the speed at which the parts may be generated is increased very markedly.

These and other objects and advantages of this invention will be more readily apparent from the following description of the drawings in which:

FIG. 1 is a cross sectional view of a stock blank utilized in the practice of the invention of this application;

FIG. 2 is a view similar to FIG. 1 but illustrating the blank after the practice of the first machining step in which the inside channel has been cut in a workpiece;

FIG. 3 is a view similar to FIG. 1 but after the practice of the second machining step;

FIG. 4 is a view similar to FIG. 1 but illustrating the blank after the practice of the third machining step;

FIG. 5 is a view of the completed workpiece;

FIG. 6 is an enlarged cross sectional view of a portion of the bellows of FIG. 5;

FIG. 7 is a top plan view of a preferred apparatus utilized in the practice of the method illustrated in FIGS. 1–5.

Figure 8:
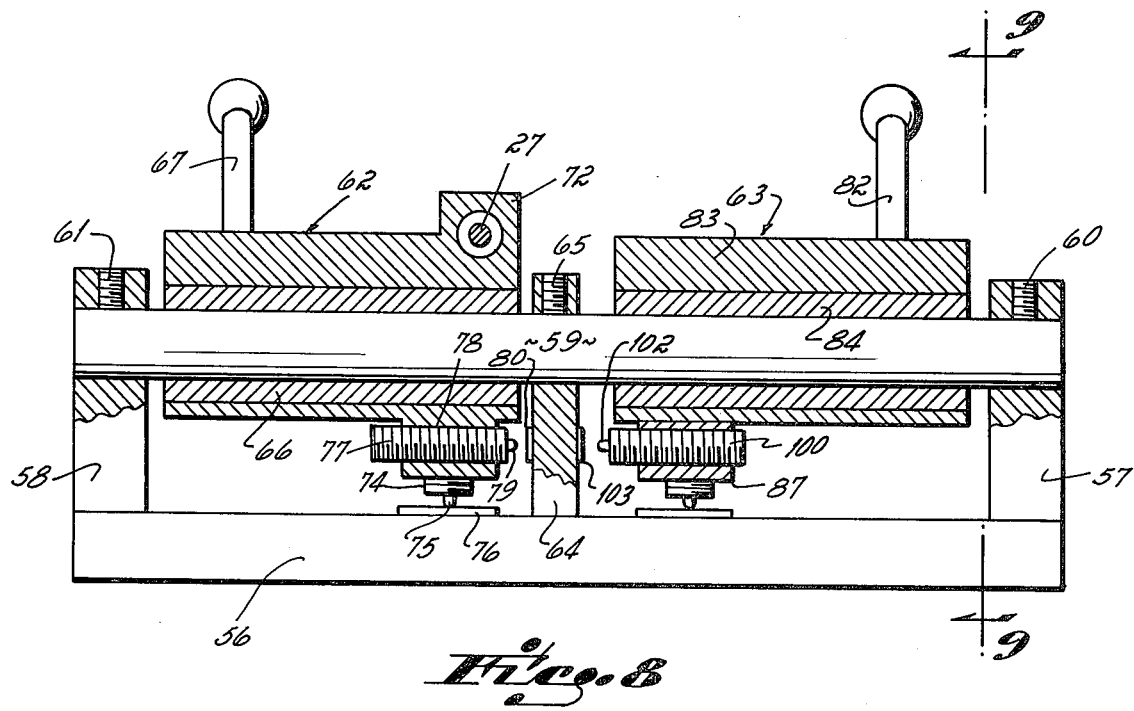
FIG. 8 is a cross sectional view taken on line 8—8 of FIG. 7.

Referring first to FIG. 1, there is illustrated a stock blank 10 of the type utilized in the practice of this invention. In the preferred embodiment this blank is manufactured from virgin Teflon which has been compression molded and die-coined in order to form it into bar stock. That bar stock is then drilled to form a through bore 11 and is counterbored to form a large diameter bore 12 through all but one end 19 of the blank. The bar stock is then turned to reduce the outside diameter and to form two peripheral flanges 13 and 14 separated by a groove 15 at the other end of the blank 10. This configuration of blank 10 forms no part of the invention of this application but has only been illustrated to show one type of blank to which the invention is applicable.

Referring now to FIGS. 2–5, it will be seen that in the practice of this invention the convolutions 17 (FIG. 5) are formed by alternately and sequentially turning generally V-shaped grooves 20, 21 and 22 (FIG. 4) on the interior and then the exterior of the stock blank. In order to turn these grooves on the blank, one end 19 of the blank is supported in a conventional collet chuck 25 of a lathe 26 (FIG. 7). The chuck grips this end 19 of the blank and effects rotation of it relative to an inside grooving tool 27 and an outside grooving tool 28.

As may be seen most clearly in FIGS. 2 and 7, the inside groove-cutting tool 27 is shaped very similarly to a conventional boring bar and has a V-shaped cutting tooth 29 extending radially from its forwardmost end. This tooth defines an included angle $\alpha$ of 47° and has the usual cutting and rake angles associated with boring bar cutters.

The outside groove-cutting tool 28 also has a V-shaped cutting edge which defines an included angle of 47°. It, too, has the conventional cutting and rake angles associated with outside grooving tools.

Referring to FIG. 2, there is illustrated the first method step in the generation of the convolutions 17 of the bellows seal. This step comprises cutting a first inside groove 20 at the end of the bellows remote from the end 19 which is supported in the chuck. After that V-shaped groove has been cut in the workpiece and the inside cutting tool withdrawn from contact with the workpiece, the outside grooving tool 28 is caused to move inwardly toward the axis of the workpiece and cut the first outside groove 21. As may be seen most clearly in FIG. 6, the two tools 27 and 28 have the apex of their V-shaped cutting edges longitudinally spaced a distance equal to one half the pitch P of a single convolution.

In one preferred embodiment of the invention, the inside cutting tool is moved radially outwardly until there is approximately 0.015–0.020 inch of stock left between the apex 30 of the cutting edge of the tool and the outside surface of the blank. Similarly, the outside cutting tool 28 is moved radially toward the axis of the rotating blank until there is 0.015–0.020 inch of bar stock located between the apex 31 of the tool 28 cutting edge and the inside surface of the bore 20. In this preferred embodiment the side wall thickness T of the convolutions is approximately 0.011–0.015 inch.

After the outside cutting tool 28 has made its first cut, the tool carriage which supports both tools 27, 28 is moved axially forwardly a distance P equal to the pitch P of the convolutions. The inside cutting tool 27 is then moved radially away from the axis to make its second cut and effect the machining of the second inside groove 22. The outside cutting tool 28 is then moved inwardly toward the axis of the workpiece until the second outside groove has been machined from the bar stock.

This alternate and sequential cutting of first an inside groove and then an outside groove is continued for the full length of bellows section 32 of the seal. When completed, a seal 33 has the configuration illustrated in FIG. 5 and the bellows or expansible portion 32 of the seal has the cross sectional configuration illustrated in FIG. 6.

This particular seal has been found to have a very high tensile strength, a long fatigue life, and high compression rates when made of Teflon, as for example, "Allied G-83." In fact, elongation rates up to 300 percent have been achieved by the practice of this invention; that is, from fully compressed to fully extended length, the bellows section may be elongated 300 percent. Of course other materials may be employed in the practice of this invention.

Figure 9:
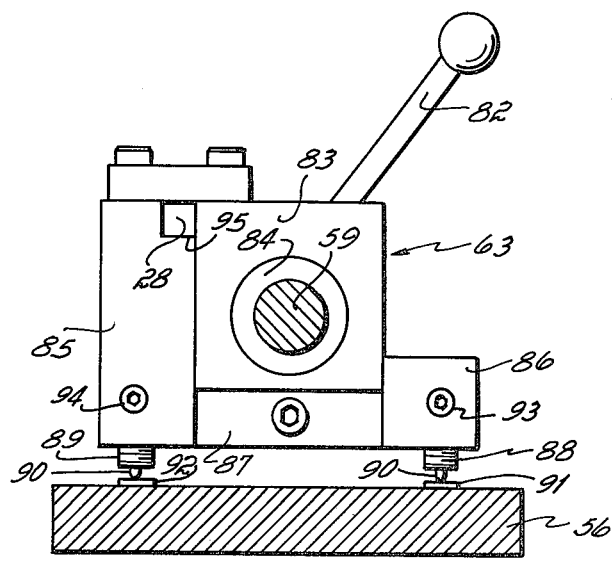
FIG. 9 is a cross sectional view taken on line 9—9 of FIG. 8.

Referring now to FIGS. 7, 8 and 9, there is illustrated a machine setup which is particularly advantageous for the practice of the machining steps illustrated in FIGS. 1–4. This setup is intended to be applied to a conventional lathe 26 of the type which comprises a headstock 40 operative to effect rotation of a spindle 41 and an attached collet chuck 25. This lathe has longitudinal ways 43 which support a carriage 44 for longitudinal movement upon rotation of a hand wheel 45. The hand wheel is operative to drive the carriage through a conventional rack and pinion drive 46.

Longitudinal adjustment of the carriage 44 is controlled by an adjustable drum 47 rotatably mounted upon a post 48 which is fixedly secured to and extends forwardly from the forward end of the carriage 44. The drum has a series of stops 50a–50i extending forwardly from it and movable into axial alignment with a fixed stop pin 51. The pin 51 extends rearwardly from a stop block 52 secured to the bed 53 of the machine.

In the preferred embodiment, the rotatable drum 47 has a conventional detent associated with it to facilitate indexing movement of the drum through positions in which the stops 50a–50i are located in longitudinal alignment with the stop pin 51. Each of these stop pins is one pitch P shorter in length than the next adjacent one so that in moving the carriage from a position in which the first stop pin 50a abuts the stop pin 51 to a position in which the next adjacent pin 50b abuts it, the carriage is moved forwardly a distance of one pitch P of a convolution 17. The purpose of this incremental movement will be explained more fully hereinafter.

Mounted atop the carriage in the position of the conventional cross slide, there is a tool-supporting base 56. This base supports three vertically upstanding support blocks 57, 58, and 64, which serve as mounting posts for a transverse support rod 59. Set screws 60, 61, and 65 secure the rod 59 in a fixed position within the blocks 57, 58, and 64. This support rod 59 serves as a slideway for two slide blocks 62 and 63, one block 62 of which carries the inside cutting tool 27 and the other block 63 of which carries the outside cutting tool 28. As is explained more fully hereinafter, the central support block 64 functions as an abutment to limit the movement of the cutting tools and thus determine the depth of the cut made by each tool.

The slide block 62 comprises a casting which is transversely bored for the reception of a press fit guide bushing 66. This bushing is received over the support rod 59 and facilitates transverse sliding of the guide block over the rod 59. A handle 67 extends upwardly from the body of the slide block so as to enable the block to be manually moved toward and away from the side wall of the stock blank 10 to effect cutting movements by the slide block mounted tool 27.

Also formed integral on the slide block is a pair of laterally extending wings 70, 71 and a tool support post 72. The wings function as outboard supports for vertically adjustable guides 73, 74. These guides are threaded into threaded bores in the bottom of the wings. Each of the guides 73, 74 has an abutment 75 which is supported by a wear pad 76 secured to the top surface of the base 56. By adjusting one guide so as to thread it into the bore and the other one so as to extend it out from the bore, the slide block 62 may be rotated about the support rod 59 so as to effect slight changes in vertical positioning of the cutting edge of the tool 27.

This slide block 62 also carries a horizontally adjustable stop 77 which is threaded into a bore 78 located in the bottom of the slide block. At its innermost end this stop 77 has an abutment 79 engageable with a wear pad 80 mounted on the vertical face of the stop block 64. Engagement of the abutment 79 with the stop 80 limits or determines the depth of cut made by the tool 27 when it is moved radially into engagement with the side wall of the stock blank 10, as is explained more fully hereinafter.

The slide block 63, rather than being formed as a casting, is built up of several rectangular blocks. These blocks comprise a central slide block 83 which contains a transverse bore fitted with a bushing 84 movable over the support rod 59. A handle 82, similar to the handle 67, extends upwardly from this block 83. In addition to the central slide block, there is a pair of side blocks 85, 86 secured to opposite sides of the main slide block 83 and a bottom plate or block 87 fixedly attached to it. The two side blocks 85, 86 have threaded bores extending upwardly from their bottom surfaces and adapted to receive adjustable outboard guides 88, 89. The lower ends of these guides 87, 88 each have an abutment 90 engageable with and slideable over wear pads 91, 92 secured to the top surface of the base 56. By adjusting the guides 88, 89 vertically within the bores, the vertical elevation of the cutting tool 28 may be adjusted incrementally so as to position it relative to a stock blank 10. After adjustment, the guides 88, 89 are held in an adjusted position by set screws 93, 94, respectively.

At its upper end the side block 85 has a transverse groove 95 adapted to receive the inner end of the cutting tool 28. A top plate 96 is bolted onto the top of the side plate 85 and the main slide block 83 over the groove 95. This plate 96 has threaded bores which receive set screws 98, 99 to hold the tool 28 in an adjusted position within the groove 95.

In order to limit the depth of cut made by tool 28, an adjustable stop 100 is threadable in a bore in the bottom plate 87. An end surface 102 on this stop is engageable with a wear pad 103 secured to the central support block 64 to arrest transverse movement of the tool 28.

In operation, a bellows seal 33 is cut from a blank 10 while it is supported and rotated in the collet chuck. The first step in the machining process is therefore to drill and counterbore the bore 11 and 12 into the interior of a solid stock blank. The exterior is then turned so as to form the flanges 13 and 14 if the bellows is to have that exterior configuration.

In order to machine the convolutions 17, the blank 10 is chucked in the collet chuck 25. The carriage 44 of the lathe 26 is then moved forwardly by rotation of the hand wheel 45 until the first stop 50a abuts the fixed stop pin 51. When this occurs, the tool 27 is in axial alignment with the location in the blank 10 where the first inside groove 20 is to be cut. The handle 67 is then gripped by the operator and manually pulled transversely toward him so as to move the cutting end 29 of the tool 27 into engagement with the inside surface of the bore 12. This movement of the handle is continued until the abutment 79 on the slide block 62 engages the wear pad 80 and arrests transverse movement of the slide block 62. When this occurs, the groove 20 will have been cut to the desired depth. Thereafter, the handle 67 is pushed away from the operator until a stop 101 at the rear of the slide block 62 engages the support block 58. The handle 82 of the other slide block 63 is then gripped by the operator and pushed so as to move the tool 28 into engagement with the outside peripheral surface of the stock blank. This slide movement is continued until the cutting tool 28 has been fed inwardly to the full depth of the first peripheral V-shaped groove 21 at which point the abutment 102 engages the wear pad 103. The handle 82 is then pulled rearwardly until a rear abutment 104 in the guide block 63 abuts the support block 57.

After completion of machining of the first two grooves 20, 21 in the interior and exterior of the blank respectively, the rotatable stop block 47 is indexed one position so as to locate the next shortest stop 50b in axial alignment with the fixed stop pin 51. The hand wheel 45 is then turned so as to place the end of stop 50b in contact with the pin 51. Thereafter, the handle 67 is pulled by the operator so as to machine the next inside groove 22 in the interior surface of the stock blank 10 and the slide returned to its rearward rest position. Thereafter, the handle 82 is pushed inwardly until the abutment 102 again engages the wear pad 103 and the tool 28 cuts the second external groove. The handle 82 and attached slide 63 and tool 28 are then returned to their rest position and the third stop 50c positioned in axial alignment with the stop pin 51. The machining procedure is then repeated, again cutting first the inside groove and then the outside groove with the two tools 27 and 28, respectively. This procedure is repeated until the bellows convolutions have been cut for the full length of the convolutions 17.

It is to be noted that in the course of machining the grooves, the cutting force is never transmitted from the workpiece to the chuck through a thin walled section of a convolution. Rather, the full thickness of the side walls of the blank transmit rotational force from the chuck to the blank or cutting force from the tool back to the chuck. Consequently, the workpiece is not distorted as a result of torsional forces transmitted through the workpiece and the blank remains rigid throughout the machining operation, even though that portion which has been completely machined is very flexible.

While I have described only a single preferred apparatus for carrying out the inventive method of this application, persons skilled in the arts to which it pertains will readily appreciate numerous changes and modifications which can be made to this apparatus while still not departing from the spirit of either the method or the apparatus inventions of this application. Therefore, I do not intend to be limited except by the scope of the following appended claims.

Having described my invention, I claim:

1. Apparatus for manufacturing a thin walled flexible bellows having multiple convolutions along the axial length of said bellows, said apparatus comprising means for rotating a tubular workpiece blank having an inside wall surface and an outside wall surface, cutting means for sequentially machining a first generally V-shaped groove into one of said surfaces of said tubular blank and a second generally V-shaped groove into the other of said surfaces, said grooves being axially spaced a distance equal to approximately one half the pitch of said convolutions, and stop means for repeatedly and sequentially repositioning said cutting means at distances axially spaced through increments of one pitch diameter of said convolutions so as to enable said cutting means to alternately and sequentially machine V-shaped grooves throughout the axial length of said multiple convolutions, said stop means including a rotatable drum having varying length stop means mounted thereon.

2. The apparatus of claim 1 wherein said V-shaped groove cutting means includes at least two cutting tools, each of which has cutting edges which define included angles of inclination of approximately 47°.

3. Apparatus for manufacturing a thin walled flexible bellows having multiple convolutions along the axial length of said bellows, said apparatus being adapted for use in combination with a lathe having a bed, a headstock mounted upon said bed and a carriage longitudinally movable over said bed, said apparatus comprising means mounted upon said headstock for supporting and rotating a tubular workpiece blank having an inside wall surface and an outside wall surface, cutting tool support means mounted upon said carriage for longitudinal movement with said carriage, said support means comprising a base secured to said carriage, a pair of independently movable tool slides mounted upon said base for transverse movement relative to a workpiece blank mounted in said blank supporting means, an inside wall surface cutting tool having a generally V-shaped cutting edge mounted in one of said slides and an outside wall surface cutting tool having a generally V-shaped cutting edge mounted in the other of said slides, said cutting edges of said tools being axially spaced a distance equal to approximately one half the pitch of said convolutions, and stop means operatively associated with said carriage for repeatedly and sequentially repositioning said carriage at distances incrementally spaced from said headstock one pitch diameter of said convolutions so as to enable said cutting tools to alternately and sequentially machine V-shaped grooves throughout the axial length of said multiple convolutions, said stop means including a rotatable drum having varying length stop means mounted thereon.

4. The apparatus of claim 3 in which each of said cutting tools has cutting edges which define included angles of inclination of approximately 47°.

5. The apparatus of claim 3 which further includes second stop means operatively associated with each of said tool slides for limiting the depth of cut made by each of said tools.

6. The apparatus of claim 5 in which said second stop means comprises at least one abutment mounted upon said bed and an adjustable stop mounted upon each of said slides and engageable with said abutment.

7. The apparatus of claim 5 which further includes at least one handle secured to said slides for effecting manual infeed of said cutting tools into said workpiece blank.

* * * * *